May 11, 1937.  W. P. SCHMITTER  2,080,152
VARIABLE SPEED TRANSMISSION
Filed Sept. 11, 1936  2 Sheets-Sheet 2
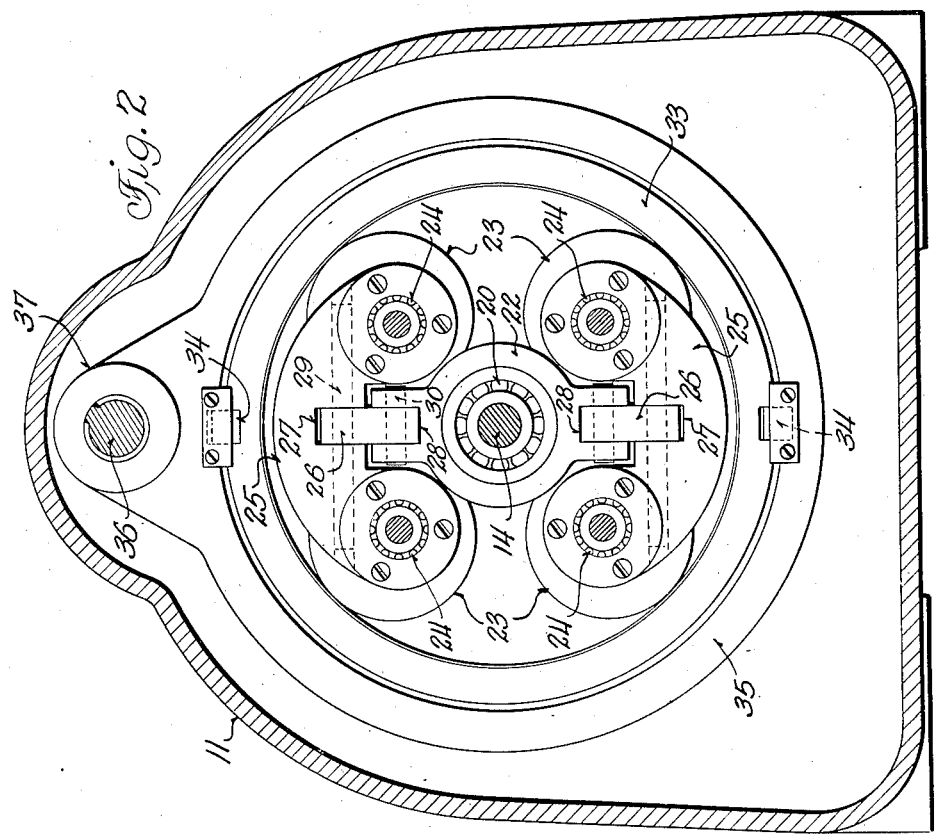
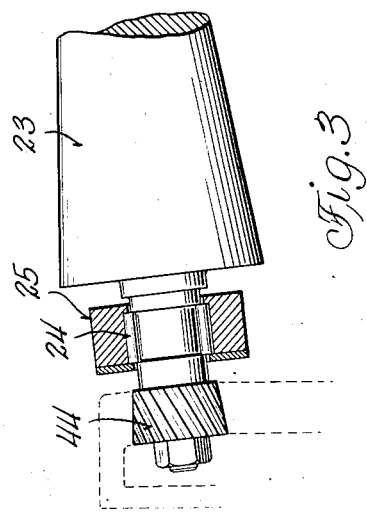
INVENTOR.
WALTER P. SCHMITTER
BY
ATTORNEY.

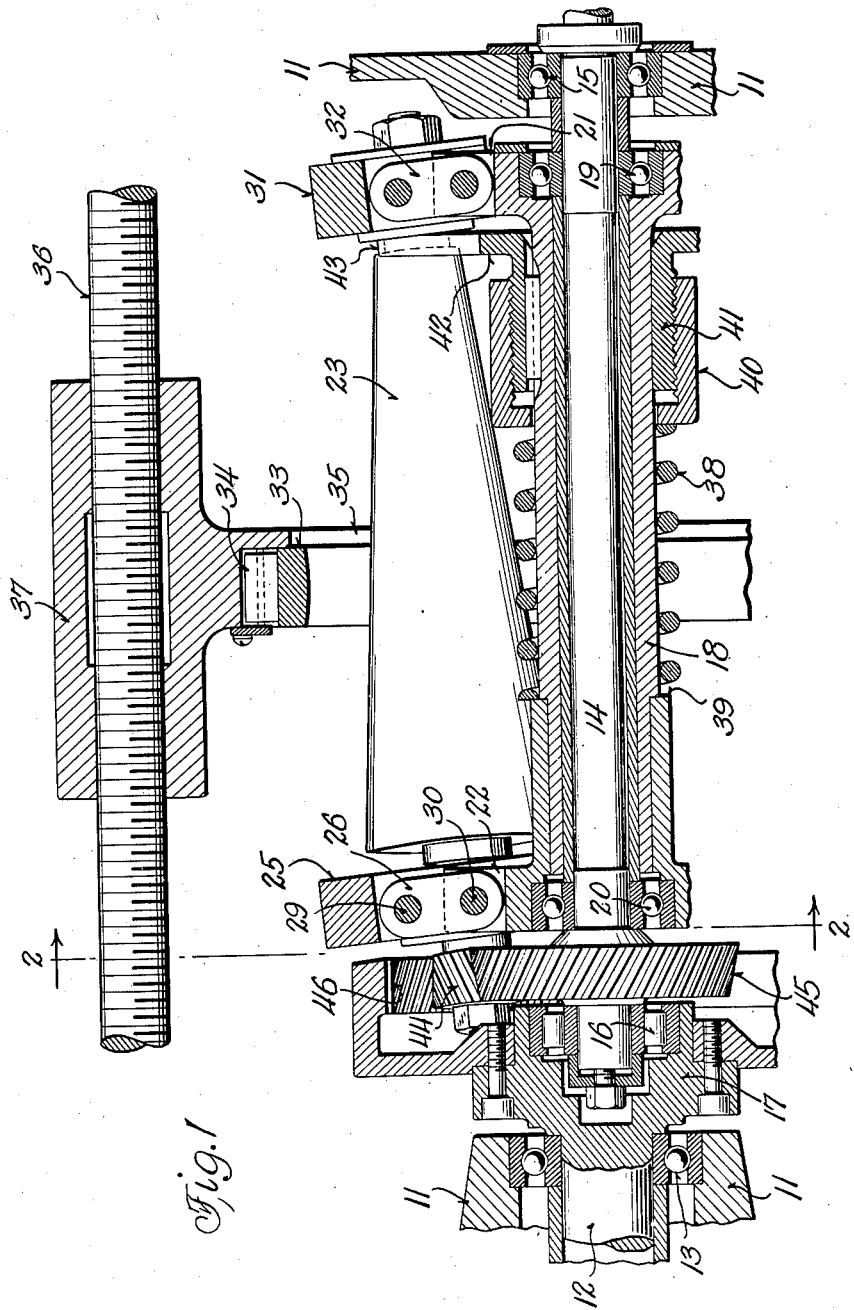

Patented May 11, 1937

2,080,152

UNITED STATES PATENT OFFICE 2,080,152

VARIABLE SPEED TRANSMISSION

Walter P. Schmitter, Milwaukee, Wis., assignor to The Falk Corporation, Milwaukee, Wis., a corporation of Wisconsin Application September 11, 1936, Serial No. 100,269

6 Claims. (Cl. 74—284)

This invention relates to variable speed transmissions of the type involving a set of inclined tapered planet rollers and an encircling traction ring adjustable lengthwise of the rollers to regulate their planetary action.

A variable speed transmission of this type, which has proven commercially successful, is disclosed in the copending application of myself and Alfred G. Bade, Serial No. 52,095, filed November 29, 1935. In the transmission therein described, contact pressures between the rollers and the ring are maintained by urging the rollers to slide lengthwise along their inclined axes. Because of the inclination of the axis, any lengthwise movement will have an outward component, tending to press the rollers outwardly against the ring. If, however, there be any considerable pressure between the rollers and the ring, there will, by such arrangement, be introduced a certain amount of frictional resistance discouraging any tendency of the rollers to slide on their axes, in overcoming which a part of the force of the pressure inducing means is wasted.

One object of the present invention is to provide, in a transmission of the character described, a roller mounting whereby force longitudinally of the rollers may be readily translated to force the rollers outwardly.

Another object is to provide, in such a transmission, pressure-inducing means wherein an outward force upon the rollers results from a force lengthwise of the rollers, transmitted without pressure-inhibited sliding contacts.

Another object is to provide an improved mounting means for the rollers.

Another object is to provide a new and improved means for effecting desired contact pressures between the rollers and the encircling ring.

Other objects and advantages will appear, either expressed or implied, from the following description of the present invention.

In the accompanying drawings:—

Fig. 1 is a fragmentary longitudinal sectional view of a portion of variable speed transmission constructed in accordance with the present invention.

Fig. 2 is a transverse sectional view taken along the line 2—2 of Fig. 1.

Fig. 3 is a view partly in elevation and partly in section of one of the bearings for the rollers.

The variable speed transmission illustrated operates in a manner similar to that of the transmission described in the application identified above, and comprises a driven shaft 12 journalled in a bearing 13 in a frame or housing 11, fragments only of which are shown. A drive shaft 14, aligned with the driven shaft 12, is journalled in a bearing 16 mounted in a head 17, fixed on the end of the driven shaft 12. A rotor 18, freely rotatable about drive shaft 14, is mounted thereon by bearings 19 and 20. This rotor 18 consists of a central tubular portion surrounding the shaft 14 and radially projecting end pieces 21 and 22. The end piece 22 is preferably formed separately from the remainder of the rotor 18 for convenience in assembling and to provide a shoulder 39 on the central tubular portion of the rotor for purposes hereinafter described.

Carried by the rotor 18 are a plurality of tapered planetary rollers 23 preferably mounted in pairs. Two pairs of such rollers are shown, although any convenient number of pairs may be used. The rollers are mounted in such position that their outer extremities are substantially parallel to the axis of the shafts 12 and 14 and so that their axes, if extended, would meet at a common apex on the extended axis of shafts 12 and 14.

The larger ends of each pair of rollers 23 are mounted in bearings 24, fixed in the opposite ends of a yoke 25 which serves to couple the pair of rollers. Each yoke 25 spans one of the outstanding portions of the end piece 22 of the rotor 18 and is connected to the end piece 22 by an upstanding inclined link 26 rockably engaged in slots 27 and 28 formed in a midportion of the yoke and the end piece 22 respectively. The link 26 is secured in place by appropriate means, such as a pivot pin 29 extending through one end of the link and the yoke 25, and by another pivot pin 30 extending through the link 26 and the end piece 22.

The opposite or smaller ends of the rollers of each pair are likewise preferably journalled in bearings in the opposite ends of a similar yoke 31, similarly supported by an upstanding link 32, rockably mounted in the end piece 21 of the rotor 18. Each link 32 is also inclined and substantially parallel to the corresponding link 26, so that each pair of rollers is permitted translatory and outward movement along arcs whose radius of curvature is equal to the length of the links, the inclination of the rollers being maintained.

Outward movement of the rollers is limited by an encircling traction ring 33 which is mounted for movement along the rollers in a manner to regulate their planetary action. The ring 33 is also preferably free to move radially in any direction so as to automatically center itself with respect to the group of rollers. In this instance it is mounted on a pair of diametrically disposed keys 34 engaged with a surrounding carrier ring 35, so as to be movable along one diameter within the ring 35, the ring 35 being free to swing about its supporting control shaft 36 in a manner to permit movement of the ring 34 with it in a direction at right angles to the direction of motion permitted by the keys 34, all as described in the copending application of myself and Alfred G. Bade, Serial No. 100,270, filed Sept. 11, 1936. Shaft 36 is in the form of a screw fixed for rotation in the housing 11 and extending through an internally threaded boss 37 on the carrier ring 35, so that rotation of the shaft imparts movement to the rings 33 and 35 lengthwise of the rollers.

The rollers 23 are urged outwardly against the traction ring 33 by centrifugal force and also by a coiled compression spring 38 in a manner similar to that described in the copending application first above identified. In this instance, the spring 38 is carried by the tubular portion of the rotor 18 and is confined between the shoulder 39 thereon and a nut 40 threaded on the hub 41 of a spider 42. The spider 42 and its hub 41 is keyed or otherwise engaged with the tubular portion of the rotor 18 for rotation therewith and for free movement axially thereof and is engaged with the yoke 31, so that it functions to transmit the thrust of the spring to yoke 31 and thereby urge the rollers 23 lengthwise and consequently outwardly against the traction ring 33.

It will be noted that due to the slight angularity of the links 26 and 32 they react under the thrust of the spring 38 and spider 42 to develop a relatively high outward pressure of the rollers 23 against the traction ring 33. This pressure may be regulated and controlled by adjustment of the nut 40 on the spider hub 41.

It will also be noted that by virtue of the radial freedom of the traction ring 33 the pressure between the pairs of rollers 23 and the ring 33 are equalized, and that there is enough play between the links 26 and 32 and the yokes 25 and 31 to equalize the pressures between the rollers of each pair and the ring 33.

Various changes may be made in the embodiment of the invention hereinabove specifically described without departing from or sacrificing the advantages of the invention as defined in the appended claims.

I claim:—

1. In a variable speed transmission the combination of a rotor, a plurality of tapered inclined planet rollers rotatable with and with respect to said rotor, a traction ring encircling said rollers and movable lengthwise thereof to regulate their planetary motion, and means for mounting said rollers on said rotor including links rockable with respect to said rotor and rollers.

2. In a variable speed transmission the combination of a rotor, a plurality of tapered inclined planet rollers rotatable with and with respect to said rotor, a traction ring encircling said rollers and movable lengthwise thereof to regulate their planetary motion, and means for mounting said rollers on said rotor including inclined links rockable with respect to said rotor and rollers.

3. In a variable speed transmission the combination of a rotor, a plurality of tapered inclined rollers rotatable with and with respect to said rotor, a traction ring encircling said rollers and movable lengthwise thereof to regulate their planetary motion, and means for mounting said rollers on said rotor including pairs of links disposed at the opposite ends of said rollers and rockable in a direction substantially lengthwise of said rotor.

4. In a variable speed transmission the combination of a rotor, a plurality of tapered inclined planet rollers rotatable with and with respect to said rotor, a traction ring encircling said rollers and movable lengthwise thereof to regulate their planetary motion, and means including pairs of inclined links rockable lengthwise of said rotor for connecting said rollers to said rotor.

5. In a variable speed transmission the combination of a rotor, a plurality of tapered inclined planet rollers rotatable with and with respect to said rotor, a traction ring encircling said rollers and movable lengthwise thereof to regulate their planetary motion, means including a set of inclined links rockable lengthwise of said rotor for supporting said rollers at one end, and means including a set of similarly inclined links for supporting said rollers at the other end.

6. In a variable speed transmission the combination of a rotor, a plurality of sets of tapered inclined planet rollers rotatable with and with respect to said rotor, a traction ring encircling said rollers and movable lengthwise thereof to regulate their planetary action, separate end supports for the rollers of each set, and mounting links rockably engaged with said supports and said rotor.

WALTER P. SCHMITTER.